United States Patent [19]

Matsuda et al.

[11] 4,387,758
[45] Jun. 14, 1983

[54] HEAVY DUTY PNEUMATIC LOW-SECTIONAL RADIAL TIRE

[75] Inventors: Hideki Matsuda, Higashimurayama; Shigeo Makino, Tokorozawa; Noboru Sugimura, Kodaira, all of Japan

[73] Assignee: Bridgestone Tire Company Limited, Tokyo, Japan

[21] Appl. No.: 296,408

[22] Filed: Aug. 26, 1981

[30] Foreign Application Priority Data

Sep. 5, 1980 [JP] Japan ................................ 55-123231

[51] Int. Cl.$^3$ .......................... B60C 3/00; B60C 9/08
[52] U.S. Cl. ............................ 152/353 R; 152/354 R; 152/356 R; 152/361 R; 152/362 R; 152/352 R
[58] Field of Search ........... 152/352 R, 352 A, 353 R, 152/353 C, 353 G, 354–356, 361, 362

[56] References Cited

U.S. PATENT DOCUMENTS

| | | | |
|---|---|---|---|
| 3,517,720 | 6/1970 | Brown | 152/352 R |
| 4,037,637 | 7/1977 | Arimura et al. | 152/352 R |
| 4,082,132 | 4/1978 | Arai et al. | 152/361 R |
| 4,328,850 | 5/1982 | Uemura | 152/352 R |
| 4,343,341 | 8/1982 | Jackson | 152/353 R |
| 4,352,383 | 10/1982 | Mabumoto et al. | 152/352 R |

*Primary Examiner*—Edward C. Kimlin
*Assistant Examiner*—Lois E. Boland
*Attorney, Agent, or Firm*—Sughrue, Mion, Zinn, Macpeak & Seas

[57] ABSTRACT

A heavy duty pneumatic low-sectional radial tire having an aspect ratio of not more than 0.8 is disclosed, which comprises a pair of bead portions, a pair of side portions, a tread portion extending across the side portions, and a reinforcement for a tire casing composed of at least one carcass ply extending across two bead cores and turning up around the bead core and containing cords embedded therein in a substantially radial direction of the tire, each cord having a modulus of not less than 4,000 kg/mm$^2$, and a belt of at least two layers, each layer containing metal cords embedded therein, superimposed around a crown portion of the carcass and crossing with each other at a relatively small angle with respect to the equatorial line of the tire. In this tire, a carcass line of the tire casing at a temporarily mounted posture on a normal rim under an internal pressure of 0.5 kg/cm$^2$ depicts a bow-shaped profile in tire section defined by a curved line, whose curvature being smaller with distance from a chord $\overline{PQ}$ at the outside thereof, where the $\overline{PQ}$ is a line segment connecting a point P to a point Q, the point P is an intersection of the carcass line and a normal line of the carcass line passing an alienating point of the bead portion from a rim flange or an inflection point of the carcass line when the intersection is located inside the inflection point and the point Q is an intersection of the carcass line and a radial line of the tire passing the point P. The bow-shaped profile of the carcass line is substantially symmetrical with respect to a substantially perpendicular bisector of the chord $\overline{PQ}$ as a symmetrical axis inside and outside thereof.

5 Claims, 1 Drawing Figure

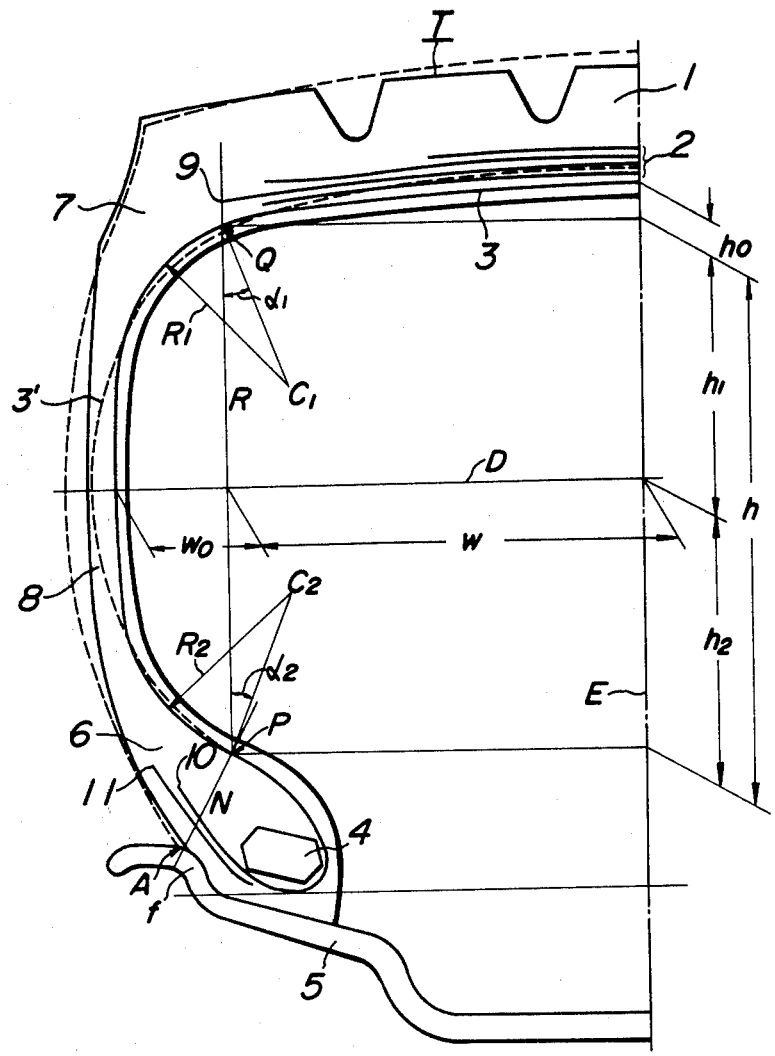

HEAVY DUTY PNEUMATIC LOW-SECTIONAL RADIAL TIRE

This invention relates to heavy duty pneumatic low-sectional radial tires.

In general, it is well-known that heavy duty pneumatic radial tires, particularly ones comprising plural belt layers each composed of metal cords in their crown portions are advantageous in puncture resistance, cornering stability, wear resistance and other characteristics when compared with the conventional bias tires used in the similar applications.

However, the radial tires of this type tend to cause a peeling phenomenon between cord and rubber or a separation failure due to the deformation, stress and the like produced during the running under a load, which is frequently produced in the vicinity of the side edges of the belt as well as the turnup end of the carcass and further an upper end of a bead reinforcing layer, which may be arranged along the turnup, when compared with the aforementioned bias tires.

This tendency is exceptionally conspicuous in tires wherein a ratio of tire height H to maximum tire width S or an aspect ratio is as low as not more than 0.8 or so-called low-sectional tires. This is because the flex zone of the tire side portion, which is not subjected to a particular reinforcement except the carcass ply and is capable of easily deforming under a load, becomes narrower in accordance with the decrease of the aspect ratio.

As a countermeasure, the reinforcement is disposed in the vicinity of each end portion as mentioned above, but the reinforcing effect is little.

Another countermeasure, attempts to reduce the radius of curvature of the carcass line in the shoulder portion of the tire. In this case, such an attempt is effective against the separation failure at the side edges of the belt, but inversely creates a bad influence on the bead portion. As a result, the separation failure is shifted to the bead portion. On the contrary, it is known that the profile of the carcass line is restricted in the bead portion. In this case, the separation failure is shifted to the shoulder portion. In any case, these counter-measures cannot basically solve the separation failure.

The above is due to the fact that when the carcass continuously extending between a pair of bead portions through the shoulder portion as a whole is deformed into an equilibrium shape under a predetermined internal pressure, the bearing of tension is changed by the inflation of the tire.

Such a mutual influence on both the shoulder and bead portions becomes conspicuous with the decrease of the aspect ratio. In the tires of this type, therefore, when the countermeasure is adopted to one of both the shoulder and bead portions, the other remaining portion is adversely affected irrespective of the arrangement of the bead reinforcing layer and the profile of the carcass line, so that it is required to simultaneously satisfy the antinomic requirements as mentioned above.

It is an object of the invention to entirely solve the problem for the above mentioned antinomic requirements or to improve the separation durability of heavy duty pneumatic low-sectional radial tires by improving the profile of the carcass line extending from the shoulder portion of the tire to the bead portion thereof to simultaneously prevent separation failures produced in the vicinity of the side edges of the belt as well as the turnup end of the carcass and further the upper end of the bead reinforcing layer, which may be arranged along the turnup.

The inventors have made various investigations with respect to the simultaneous solution of the antinomic requirements and obtained the following viewpoints.

First, it is necessary to equally balance the tension-bearing of the carcass in both the shoulder and bead portions. Second, it is necessary to enhance the tension-bearing of the carcass in the side portion extending between the shoulder portion and the bead portion in order to simultaneously mitigate the tension-bearing in both the shoulder and bead portions.

Considering the deformation of the carcass line before and after the inflation with a normal internal pressure, particularly the balance of tension-bearing in each of the shoulder, side and bead portions, the inventors have found that the profile of the carcass line is made proper over the whole of these portions so as to satisfy the aforementioned requirement. For this purpose, it is important to determine the carcass line before inflation with the normal internal pressure.

Now, when the tire is merely mounted on a normal rim, the familiarity for achieving a complete adaptation is not yet obtained, so that such a mounted state cannot be considered a fundamental posture defining the above proper carcass line. Here various studies have been made with respect to the values for realizing the proper mounting of the tire on the normal rim under such an internal pressure that the tire is not substantially subjected to an influence by inflation with normal internal pressure and the carcass line is not particularly changed after the vulcanization of the tire. As a result, it has been investigated that a temporarily mounted posture under an internal pressure of 0.5 kg/cm$^2$ can be made a most fundamental posture.

Next, the invention is premised on pneumatic low-sectional radial tires and seeks to improve tire performance in the tire having an aspect ratio H/S, which is usually defined by a ratio of tire height H to maximum tire width S, of not more than 0.8, particularly 0.74 to 0.5. In this case, the tire casing is reinforced by at least one carcass ply extending across the two bead cores and containing cords embedded therein in a substantially radial direction of the tire, each cord having a modulus of not less than 4,000 kg/mm$^2$ and being made of, for example, aromatic polyamide fibers or metals, particularly steel wires, and a belt of at least two layers. Each layer contains cords of a metal, particularly steel wires embedded therein, superimposed around a crown portion of the carcass and crossing with each other at a relatively small angle with respect to the equatorial line of the tire while ensuring the above mentioned aspect ratio by a so-called hoop effect of the belt.

Moreover, the carcass is turned up around the bead core embedded in the bead portion of the tire and if necessary, a rubberized layer of metal cords, particularly steel wires, cord cloth or canvass of organic fiber materials such as nylon fiber and polyester fiber, or the like may be disposed along the turnup portion of the carcass as a bead reinforcing layer.

In the pneumatic low-sectional radial tires according to the invention, the following matter is restricted for the carcass line of the tire casing in the above mentioned temporarily mounted posture, particularly the profile thereof extending from the shoulder portion to the bead portion.

That is, the carcass line depicts a bow-shaped profile in tire section defined by a curved line, whose curvature is smaller with distance from a chord $\overline{PQ}$ at the outside of the chord $\overline{PQ}$. The chord $\overline{PQ}$ is a line segment connecting a point P to a point Q, the point P is an intersection of the carcass line and a normal line N of the carcass line passing an alienating point A of the bead portion from a rim flange or an inflection point of the carcass line when the intersection is located inside the inflection point and the point Q is an intersection of the carcass line and a radial line of the tire passing the point P. Further, the bow-shaped profile is substantially symmetrical with respect to a substantially perpendicular bisector D of the chord $\overline{PQ}$ as a symmetrical axis inside and outside thereof, and a distance $w_0$ between the carcass line and the chord $\overline{PQ}$ as measured along the perpendicular bisector D corresponding to 0.25–0.35 times a distance w between the chord $\overline{PQ}$ and an equatorial plane E of the tire. In the profile of the carcass line as mentioned above, when the tire width is enlarged by inflation with the normal internal pressure, the deformations of the carcass at the vicinity of the side edges of the belt as well as the turnup end of the carcass and further the upper end of the bead reinforcing layer, which may be arranged along the turnup portion of the carcass, are minute when compared with the deformation produced at the side portion.

In the practice of the invention, it is preferable that the curved line forming the bow-shaped profile in section of the carcass line has a minimum radius of curvature corresponding to 0.3–0.4 times a length h of the chord $\overline{PQ}$, and that the side edge of the belt is located in an extension of the chord $\overline{PQ}$, and further that the crown center of the carcass line is positioned at a vertical distance $h_0$ corresponding to not more than 0.17 times the distance w between the chord $\overline{PQ}$ and the equatorial plane E with respect to the intersection Q.

The term "substantially perpendicular bisector D of chord $\overline{PQ}$" as used herein means that the length h of the chord $\overline{PQ}$ is divided into two parts $h_1$ and $h_2$ within an acceptable range of $0.5h \pm 0.025h$. Further, the term "substantial symmetry of bow-shaped profile with respect to the perpendicular bisector D as symmetrical axis" used herein means that a slight deviation is acceptable in the perpendicular bisector D and also the radii of curvature $R_1$, $R_2$, which are smallest near both ends of the bow-shaped profile, are actually coincident with each other within an acceptable range of $0.35h \pm 0.05h$ with respect to the length h of the chord $\overline{PQ}$.

Moreover, line segments connecting centers $C_1$, $C_2$ in the radii of curvature $R_1$, $R_2$ to the intersections Q, P have preferably inclination angles $\alpha_1$, $\alpha_2$ of not more than 35° with respect to the chord $\overline{PQ}$, respectively. In this case, the inclination angle becomes smaller as the aspect ratio of the tire reduces.

According to the invention, when the carcass line satisfies the relationship of $h_1 \cong h_2$ and $R_1 \cong R_2$ within the above mentioned acceptable ranges, simultaneous mitigation and suppression of deformations in both the shoulder and bead portions can be realized without influencing one of both the shoulder and bead portions to the other. On the contrary, the above requirement cannot be satisfied in such a bow-shaped profile of the carcass line that the substantially perpendicular bisector D is positioned at a deviation degree of more than 2.5% with respect to the length h of the chord $\overline{PQ}$ and the minimum radii of curvature $R_1$, $R_2$ preferably selected from the range of 0.3h to 0.4h deviate from the substantially symmetrical relationship within the acceptable range of $0.35h \pm 0.05h$ with respect to the length h of the chord $\overline{PQ}$.

Furthermore, the distance $w_0$ between the bow-shaped profile and the chord $\overline{PQ}$ must be within a range of 0.25–0.35 times the width w between the chord $\overline{PQ}$ and the equatorial plane E of the tire. When the distance $w_0$ exceeds the upper limit, the displacement of the side portion before and after the inflation with the normal internal pressure cannot be obtained properly and the elimination and suppression of deformation in both the shoulder and bead portions are not effective in practice, while when the distance $w_0$ is less than 0.25w, the deformation produced in the side portion is excessive, which adversely affects the shoulder and bead portions. Preferably, the distance $w_0$ is within a range of 0.27w to 0.32w.

When the side edge of the belt is located in an extension of the chord, it is prevented from transmitting the influence of chord deformation to the shoulder portion, so that a better result can be obtained.

When the plateau degree of the belt is limited so that the vertical distance $h_0$ of the carcass line from the intersection Q at the center of the crown portion is not more than 0.17 times, preferably not more than 0.15 times with respect to the width w between the chord $\overline{PQ}$ and the equatorial plane E of the tire, it can advantageously be mitigated to transmit the influence of repeated deformation resulted from the ground contacting of the crown portion to the shoulder portion.

The invention will now be described with reference to the accompanying drawing, wherein:

A single FIGURE is a schematic radial half section of an embodiment of the tire according to the invention.

In the single FIGURE, only the left-hand radial half section of the tire according to the invention is shown as a temporarily mounted posture of the tire on a normal rim under an internal pressure of 0.5 kg/cm². Of course, the right-hand half section, not shown, is symmetrical with the left-hand half section. The dimensions of this tire are as follows:

| Tire size: | 11/70R22.5 16PR |
| Normal rim to be used: | 8.25 × 22.5 |
| Normal internal pressure: | 8.9 kg/cm² |

In the FIGURE, the tire T comprises a belt 2 superimposed around a crown portion 1 of a carcass 3. The belt 2 is composed of four rubberized layers each containing usual steel cords embedded therein and crossing with each other at a relatively small angle with respect to the equatorial line of the tire. The carcass 3 is composed of one rubberized ply containing metal cords, particularly steel cords embedded therein and arranged in a substantially radial plane of the tire, which is turned up around a bead core 4 from inward to outward.

In the FIGURE, numeral 5 is a normal rim, numeral 6 a bead portion restrained by a rim flange f, numeral 7 a shoulder portion and numeral 8 a side portion.

In the illustrated embodiment, P is an intersection of the carcass line and a normal line N of the carcass line passing an alienating point A of the bead portion 6 contacting with the rim flange f of the normal rim 5 from the rim flange f (in this case, the point P means to be a fixed end of the carcass 3 at such a state that the carcass 3 is hardly substantially deformed), Q is an intersection of the carcass line and a radial line R of the tire passing the intersection P and perpendicular to the rotational axis line of the tire, and a line segment connecting these intersections to each other is a chord $\overline{PQ}$. Regarding the bow-shaped profile of the carcass line in tire section, the length h of the cord $\overline{PQ}$ is 127 mm and the distance w between the chord $\overline{PQ}$ and the equatorial plane E of the tire is 100 mm. Further, the distance $w_0$ of the bow-shaped profile from the chord $\overline{PQ}$ is 27 mm. Therefore, a ratio of $w_0$ to w is 0.27, which is within a range of 0.25-0.35.

Considering a straight line passing a position of maximum width of the carcass line and parallel to the rotational axis of the tire, the chord $\overline{PQ}$ is substantially divided into two parts by the above straight line in such a manner that a distance $h_1$ from the straight line to the intersection Q is 63 mm and a distance $h_2$ from the straight line to the intersection P is 64 mm. That is, the ratios of the distances $h_1$ and $h_2$ to the length h are $h_1/h=0.496$ and $h_2/h=0.503$, respectively, which are within the acceptable range of 0.475-0.525.

The radii of curvature $R_1$ and $R_2$ at the intersections P and Q in the bow-shaped profile of the carcass line are 40 mm. That is, the ratio of the radius of curvature $R_1$, $R_2$ to the length h is 0.31, which is within the range of 0.30-0.40.

Moreover, line segments connecting the intersections Q, P to the centers in the radii of curvature $R_1$, $R_2$ have inclination angles $\alpha_1$, $\alpha_2$ of 10° with respect to the chord $\overline{PQ}$, which are within the range of $\alpha_1$, $\alpha_2 \leq 35°$.

The vertical distance $h_0$ of the crown center of the carcass line from the intersection Q is 11 mm. That is, a ratio of distance $h_0$ to the distance w is 0.11, which is within the range of not more than 0.17.

As to the belt 2, the side edge of the widest belt layer is located in the extension of the chord $\overline{PQ}$. When the width of the belt layer is extremely narrow, eccentric wear is apt to be caused, while when the width of the belt layer is much wider so as to extend over the extension, the shearing strain increases at the side edge of the belt layer.

When the tire T is inflated with the normal internal pressure of 8.9 kg/cm², the bar, the profile of the carcass 3 extending from the shoulder portion 7 to the bead portion 6 is changed into a state shown by a broken line 3', whereby the stress concentration produced in both the shoulder and bead portions 7, 6 during the running of the tire under a load is simultaneously and effectively mitigated, which advantageously suppresses the occurrence of separation failure at the side edge 9 of the belt 2 as well as the turnup end 10 of the carcass 3 and the upper end 11 of the bead reinforcing layer.

Next, the tire T according to the invention is compared with the conventional tires as mentioned below.

1. Conventional tire A (which is called as a natural profile)

This tire is the same as in the FIGURE except the following. That is, the profile of the carcass line extending from the shoulder portion 7 to the bead portion 6 (under an internal pressure of 0.5 kg/cm²) is substantially the same as the profile shown by the broken line of the FIGURE after the inflation with the normal internal pressure, and $R_1$, $R_2$ and $w_0$ are 80 mm, 90 mm and 40 mm, respectively.

2. Conventional tire B

This tire is the same as the conventional tire A except that in the profile of the carcass line extending from the shoulder portion 7 to the bead portion 6, the radius of curvature $R_2$ near the intersection P at the bead portion is smaller than the radius of curvature $R_1$ at the shoulder portion, i.e. $R_1=80$ mm and $R_2=40$ mm.

3. Conventional tire C

This tire is the same as the conventional tire A except that the radius of curvature $R_1$ is smaller than that $R_2$ in contrast with the case of the conventional tire B, i.e. $R_1=40$ mm and $R_2=90$ mm.

The comparison result as mentioned below is indicated by an index on the basis that the conventional tire A is 100.

I. Test for durability against separation at side edge of belt

Test method:

After the tire is mounted on the normal rim and inflated with the normal internal pressure, it is run on a drum at a constant speed (80 km/h), while increasing a load at a step-like rate, to perform the durability test.

The measured results are shown in the following Table 1.

TABLE 1

| Tire according to the invention | Conventional tires | | |
|---|---|---|---|
| | A | B | C |
| 125 | 100 | 70 | 135 |

II. Test for durability against separation at turnup end of carcass and upper end of bead reinforcing layer Test method:

After the tire having a buffed tread is mounted on the normal rim and inflated with the normal internal pressure, it is run on a drum at a constant speed (80 km/h), while increasing a load at a step-like rate, to perform the durability test.

The measured results are shown in the following Table 2.

TABLE 2

| Tire according to the invention | Conventional tire | | |
|---|---|---|---|
| | A | B | C |
| 130 | 100 | 130 | 65 |

According to the invention, the antinomic requirements relating to the prevention of separation failure conventionally produced in the shoulder and bead portions can simultaneously be achieved by defining a novel profile of carcass line, whereby the durability of heavy duty pneumatic low-sectional radial tire can be improved effectively.

What is claimed is:

1. In a heavy duty pneumatic low-sectional radial tire having an aspect ratio of $H/S \leq 0.8$ where H is a tire height and S is a maximum tire width and comprising a pair of bead portions, a pair of side portions, a tread portion extending across said side portions, and a reinforcement for a tire casing composed of at least one carcass ply extending across two bead cores embedded in said bead portions and turning up around said bead core and containing cords embedded therein in a substantially radial direction of the tire, each cord having a modulus of not less than 4,000 kg/mm², and a belt of at least two layers, each layer containing metal cords embedded therein, superimposed around a crown portion of said carcass and crossing with each other at a relatively small angle with respect to the equatorial line of the tire, the improvement wherein a carcass line of said tire casing at a temporarily mounted posture of the tire on a normal rim under an internal pressure of 0.5 kg/cm² depicts a bow-shaped profile in tire section defined by a curved line, whose curvature being smaller with distance from a chord $\overline{PQ}$ at the outside of the chord $\overline{PQ}$, where the chord $\overline{PQ}$ is a line segment connecting a point P to a point Q, the point P is an intersection of said carcass line and a normal line of said carcass line passing an alienating point of said bead portion from a rim flange or an inflection point of said carcass line when said intersection is located inside said inflection point and the point Q is an intersection of said carcass line and a radial line of the tire passing said point P; said bow-shaped profile is substantially symmetrical with respect to a substantially perpendicular bisector of said chord $\overline{PQ}$ as a symmetrical axis inside and outside thereof; and a distance $w_0$ between said chord $\overline{PQ}$ and said carcass line as measured along said perpendicular bisector is 0.25–0.35 times a distance w between the chord $\overline{PQ}$ and an equatorial plane of the tire, whereby deformations at the vicinity of side edges of said belt as well as the turnup end of said carcass and upper end of bead reinforcing layer, which may be arranged along the turnup portion of said carcass, when the width of the tire is enlarged by inflation with a normal internal pressure, are minute as compared with the deformation produced at said side portion.

2. The tire according to claim 1, wherein said curved line forming said bow-shaped profile in section of the carcass line has a minimum radius of curvature corresponding to 0.3–0.4 times a length of said cord $\overline{PQ}$.

3. The tire according to claim 1, wherein each side edge of said belt is located in an extension of said chord $\overline{PQ}$.

4. The tire according to claim 1, wherein the crown center of said carcass line is positioned at a vertical distance corresponding to not more than 0.17 times said distance w between the chord $\overline{PQ}$ and the equatorial plane of the tire with respect to said intersection Q.

5. The tire according to claim 1, wherein line segments connecting respective radii of curvature to the intersections of points Q and P define inclination angles $\alpha_1$ and $\alpha_2$ with respect to said chord $\overline{PQ}$ and wherein $\alpha_1$ and $\alpha_2$ do not exceed 35°.

* * * * *